J. H. WHITE.
COMPUTING DEVICE.
APPLICATION FILED APR. 29, 1918.
1,413,088.
Patented Apr. 18, 1922.
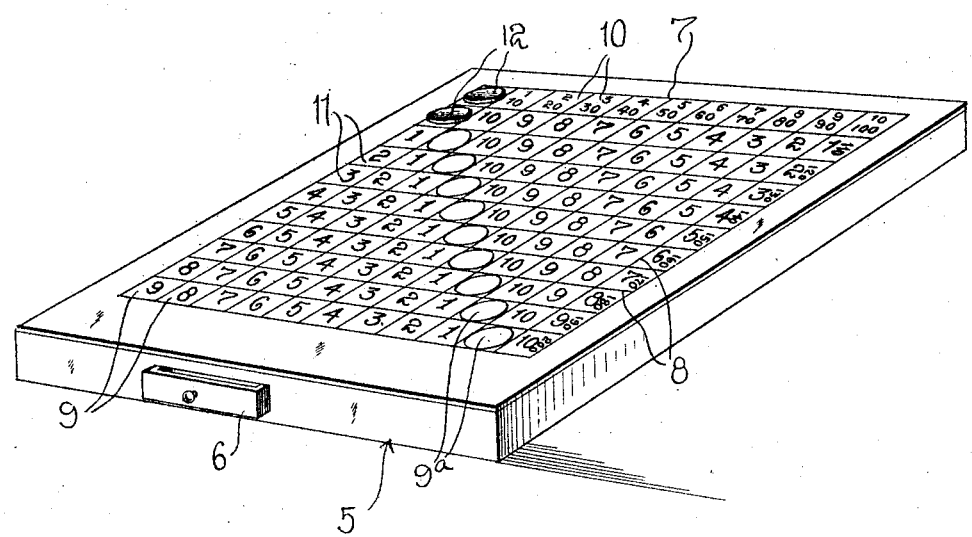
Inventor
J. H. White
By Watson E. Coleman
Attorney

UNITED STATES PATENT OFFICE.

JOHN H. WHITE, OF HOLLIS, OKLAHOMA.

COMPUTING DEVICE.

1,413,088.     Specification of Letters Patent.    Patented Apr. 18, 1922.

Application filed April 29, 1918. Serial No. 231,433.

*To all whom it may concern:*

Be it known that I, JOHN H. WHITE, a citizen of the United States, residing at Hollis, in the county of Harmon and State of Oklahoma, have invented certain new and useful Improvements in Computing Devices, of which the following is a specification, reference being had to the accompanying drawings.

This invention relates to computing devices, and has for its primary object to provide an exceedingly simple, easily operable, and highly efficient device for quickly solving various numerical problems.

It is also a further object of the invention to provide a device for the above purpose which can be manufactured and sold at small cost and which will be accurate and reliable in operation.

With the above and other objects in view, the invention consists in the improved construction and arrangement of the several features as will be hereinafter more fully described, subsequently claimed and illustrated in the accompanying drawing wherein I have illustrated a perspective view of my improved computing device.

In the preferred embodiment of the invention, a suitable base 5 is provided, preferably of wood, and if desired this base may be provided with a small drawer indicated at 6 to receive the indicators to be hereinafter referred to.

The computing chart 7 is printed upon heavy cardboard and is adhesively or otherwise secured to the upper surface of the base 5. Upon the surface of the chart there is printed or otherwise delineated a rectangular field divided by the intersecting lines 8 into a plurality of substantially square spaces 9. There are a total of 121 of these spaces, there being 11 horizontal divisions and 11 vertical divisions of the field.

The upper horizontal row of spaces 9, reading from left to right, contain the digits indicated at 10, 0, 10, 20, 30, 40, 50, 60, 70, 80, 90, and 100, said spaces being indicative of multiples of 10, as shown by the digits 1, 2, 3, 4, 5, 6, 7, 8, 9, and 10 in the spaces numbered 10 to 100 respectively.

Along the vertical series of spaces 9 at the right hand side of the chart, the multiple digits 10 are continued to 200 which appears in the space at the lower right hand corner.

Extending diagonally of the chart there are a series of blank spaces 9ª beginning at the space below the digit at the upper left hand corner and ending at the space to the left of the multiple number 200 in the lower right hand corner. Each vertical row or series of spaces 9 below each of the blank spaces 9ª contains the consecutively numbered digits 11 beginning with the numeral 1 in the space immediately below the blank 9ª. The spaces 9 extending vertically above the blanks 9ª also contain the consecutive digits 12, beginning with the numeral 10 immediately adjacent to the blank space. The vertical series of spaces 9 at the right hand side of the chart beginning with the space in the second horizontal row, are numbered from 1 to 10 consecutively.

In conjunction with the computing chart, two indicating members 12 are used. These indicating members may be in the form of circular wood disks, or they may be made in any other desired shape and of any preferred material.

In the use of my improved computing device, assuming that it is desired to add together the numerals 8, 3, 7, 5, 9, and 6, one of the indicators 12 is placed on the zero digit 10 at the upper left hand corner of the chart and the other indicator is placed in the blank space 9ª immediately below this digit. The first numeral to be considered, namely 8, is found in the vertical row of digits 11 immediately below the indicators, and the indicator which is in the blank space is moved to the blank space 9ª at the right of this numeral 8. The next numeral to be added is 3 which does not appear below the indicator in the blank space 9ª and therefore this numeral 3 is found in the vertical row of numerals to the right of that in which the indicator is positioned. The 3 is found in the third row of horizontal spaces and the indicator is moved upwardly upon the chart to the blank space 9ª at the left of this numeral 3, or in the second vertical row of spaces. The other indicator 12 is now moved one space to the right which contains the multiple 10. This move is made each time the first indicator is moved reversely or upwardly upon the chart. The next numeral to be added is 7, and this numeral is found below the indicator in the second series of spaces and is moved into the blank space 9ª at the right thereof. The next numeral 5 does not appear below the indicator but is found in the next column at the right and the indicator is then again moved backwardly on the chart to the blank 9ª at the left of this numeral. The other indicator is again moved one space to the right which contains the multiple number 20. 9, the next numeral to be added, is not found below the indicator in the blank space 9ª, and said indicator is therefore again moved upwardly to the blank space at the left of the numeral 9 in the next column at the right. The multiple indicator is therefore again moved one space to the right. The last numeral 6 to be added appears below the indicator in the blank space 9ª, and said indicator is moved to the blank space at the right of this numeral. The result is found by adding the multiple numeral 30 at the top of the chart and the numeral 8 in the space 9 at the left hand side of the chart which is opposite to the other indicator 12 in the blank space 9ª, thus giving a total of 38. In this way, long columns of figures may be quickly added with a little practice.

The device may also be employed for solving problems in subtraction. In such cases, the top row of horizontal numerals reading consecutively 1 to 10 from left to right represent the minuend numerals and the vertical row of numerals from 1 to 9 at the left represent the subtrahend numerals. Thus, if it is desired to subtract 3 from 7, the 3 is located in the top row of horizontal numerals and the 7 in the vertical row of numerals at the left. To the right of this numeral and in line with the subtrahend numeral 3, appears the numeral 4, or the answer to the problem. In a similar manner, various other problems in subtraction may be performed.

My improved computing chart as above described is very advantageous in the instruction of school children, and may be placed in the hands of the individual pupils or used by the instructor for the benefit of the entire class. The chart may be printed on the back of paper tablets such as are generally used by school pupils, or it can be supplied in the form illustrated in the accompanying drawing.

From the foregoing description, taken in connection with the accompanying drawing, the construction, several advantages and manner of use of the invention will be clearly and fully understood. As there are no relatively movable mechanical parts employed in the construction of the invention, it will be appreciated that the same can be produced at very small manufacturing cost. It is also accurate and reliable. The key to the operation of the device is quite simple, and after a short period of use complicated problems may be readily solved. In carrying out my invention in practice, it will be understood that the chart and the digits thereon may be of any desired size, and the surface of the chart may be ornamented and colored as preferred.

Having thus described my invention, what I claim is:—

An educational appliance for use in simple arithmetic, comprising a chart having vertical and horizontal intersecting rows of squares, a diagonal row of blank squares extending from the left of the second horizontal row of squares from the top to the lower end of the second vertical row from the right, the squares above the blank being numbered from ten vertically and horizontally in a decreasing order, and the squares below the blank squares numbered from one vertically and horizontally in an increasing order, and an indicator movable over the squares to indicate on the top or right marginal column together with the left marginal column the sum of the numbers added.

In testimony whereof I hereunto affix my signature in the presence of two witnesses.

JOHN H. WHITE.

Witnesses:
J. L. LAMKIN,
E. P. EDWARDS.